US009108662B1

(12) United States Patent  (10) Patent No.: US 9,108,662 B1
Scholin  (45) Date of Patent: Aug. 18, 2015

(54) SAFETY HAND CART (71) Applicant: Craig J. Scholin, Marshfield, WI (US)

(72) Inventor: Craig J. Scholin, Marshfield, WI (US)

( * ) Notice: Subject to any disclaimer, the term of this patent is extended or adjusted under 35 U.S.C. 154(b) by 0 days.

(21) Appl. No.: 14/561,560

(22) Filed: Dec. 5, 2014

Related U.S. Application Data

(60) Provisional application No. 61/933,565, filed on Jan. 30, 2014.

(51) Int. Cl.
*B62B 5/02* (2006.01)
*B62B 1/16* (2006.01)
*B62B 5/04* (2006.01)

(52) U.S. Cl.
CPC .... *B62B 1/16* (2013.01); *B62B 5/04* (2013.01)

(58) Field of Classification Search
CPC ............. B62B 1/16; B62B 5/04; B62B 1/00; B62B 1/008; B62B 1/02; B62B 1/08; B62B 1/10; B62B 1/18; B62B 1/186; B62B 3/08
USPC ............................................ 280/47.12, 47.16
See application file for complete search history.

(56) References Cited

U.S. PATENT DOCUMENTS

| 820,274 | A | * | 5/1906 | Watley .................... 280/43.24 |
| 1,168,008 | A | * | 1/1916 | Kleine ..................... 280/47.16 |
| 1,327,864 | A | * | 1/1920 | Everingham ............... 280/47.16 |
| 1,804,403 | A | * | 5/1931 | Dowling ........................ 37/434 |
| 3,043,033 | A | * | 7/1962 | Ingram et al. ................... 37/434 |
| 3,337,973 | A | * | 8/1967 | Prescott ........................... 37/265 |
| 4,062,591 | A | * | 12/1977 | Harris et al. ...................... 298/2 |
| 5,118,124 | A | * | 6/1992 | Storay et al. ............... 280/47.21 |
| 7,937,859 | B2 | * | 5/2011 | Downes ......................... 37/434 |
| 8,764,027 | B1 | * | 7/2014 | Della Polla ..................... 280/5.2 |
| 2005/0087958 | A1 | * | 4/2005 | Tomchak et al. ............. 280/653 |
| 2013/0062844 | A1 | * | 3/2013 | Stevens ...................... 280/47.26 |

* cited by examiner

Primary Examiner — John Walters
Assistant Examiner — Brian Swenson
(74) Attorney, Agent, or Firm — Cook Alex Ltd.

(57) ABSTRACT

A wheelbarrow is provided comprising a bed for receiving a load, with an axle mounted to the bed. First and second load-bearing wheels are rotatably mounted to the axle on opposite sides of the bed. First and second rotatable stabilizing wheels are mounted to first and second support arms, respectively, with each of the first and second support arms being rotatably mounted relative to the axle on opposite sides of the bed. A first locking mechanism is associated with at least one, and preferably each, of the first and second load-bearing to selectively permit or prevent rotation of the load-bearing wheels relative to the axle. A second locking mechanism is associated with at least one, and preferably each, of the first and second support arms to selectively permit or prevent rotation of the support arms relative to the axle. An actuator is provided for selectively locking and unlocking each of the first and second locking mechanisms.

17 Claims, 7 Drawing Sheets

SAFETY HAND CART

FIELD OF THE DISCLOSURE

The present disclosure is directed to an improved hand cart, and, more particularly, that is easier and safer to use than conventional hand carts.

BACKGROUND

Conventional hand carts, such as wheelbarrows or lift carts, typically include a bed or bucket supported by one or more load-bearing wheels positioned ahead of the center of gravity of the hand cart and support legs or wheels positioned behind the center of gravity. Because of the relatively long moment arm between the center of gravity and the axis of rotation of the load-bearing wheels, such a configuration requires greater strength by the user, as a larger percentage of the total load must be lifted to raise the support legs or wheels off the ground, both for transport, especially over uneven terrain, and, in the case of a wheelbarrow, for dumping, when the wheelbarrow needs to be tipped.

Additionally, in the case of wheelbarrows, the load-bearing wheels of conventional wheelbarrows are typically positioned adjacent or along the longitudinal centerline of the wheelbarrow. This tends to make such wheelbarrows laterally unstable, and difficult to control, especially when carrying heavy loads.

By way of the present disclosure, a hand cart is provided that overcomes these drawbacks.

SUMMARY

In a first aspect, a hand cart is provided comprising a bed for receiving a load; an axle mounted to the bed; first and second load-bearing wheels rotatably mounted to the axle on opposite sides of the bed; first and second rotatable stabilizing wheels mounted to first and second support arms, respectively, with each of the first and second support arms being rotatably mounted relative to the axle on opposite sides of the bed; a first locking mechanism associated with at least one, and preferably each, of the first and second load-bearing wheels to selectively permit or prevent rotation of the load-bearing wheels relative to the axle; a second locking mechanism associated with at least one, and preferably each, of the first and second support arms to selectively permit or prevent rotation of the support arms relative to the axle; and an actuator for selectively locking and unlocking each of the first and second locking mechanisms.

In another aspect, the hand cart further comprises a handle, the actuator being mounted to the handle. Preferably, the handle comprises a grip, and the actuator is mounted to the handle adjacent to the grip.

In a further aspect, the actuator simultaneously locks and unlocks both the first and second locking mechanisms. Alternatively, the actuator selectively and independently locks and unlocks the first and second locking mechanisms.

In another aspect, the first locking mechanism preferably, but not necessarily, comprises a first toothed wheel associated with each of the first and second load-bearing wheels, with a pawl for each toothed wheel pivotably mounted to the bed for selective engagement with each of the first toothed wheels. Similarly, the second locking mechanism comprises a second toothed wheel associated with each of the first and second support arms, with a pawl for each second toothed wheel pivotably mounted to the bed for selective engagement with each of the second toothed wheels.

Other aspects will become apparent upon reference to the accompanying drawings and the following detailed description.

DETAILED DESCRIPTION

Figure 1:
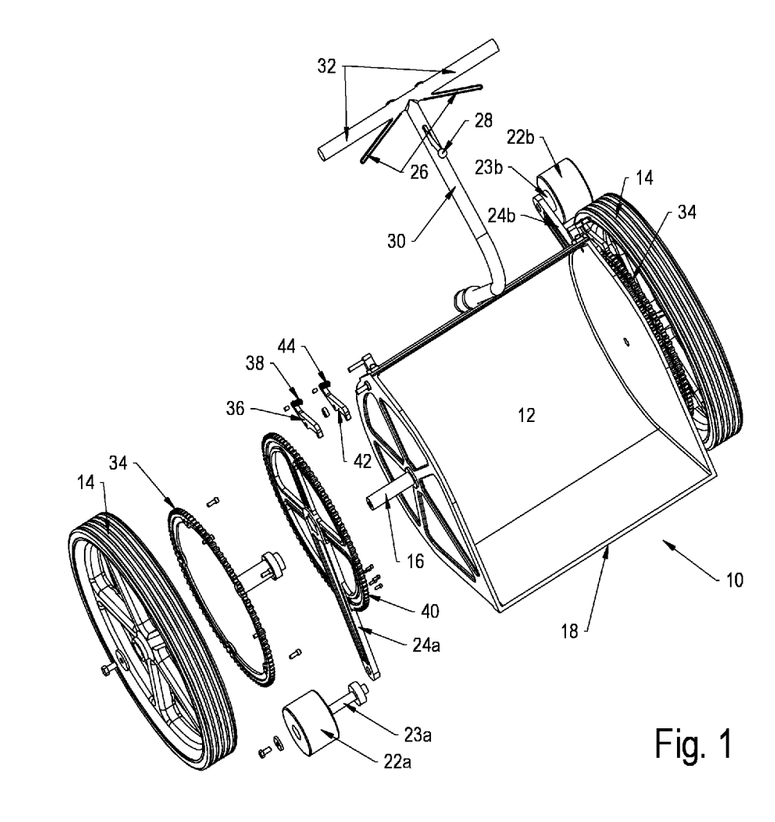
FIGS. 1-3 are partially-exploded perspective views of a wheelbarrow according to the present disclosure.
Figure 2:
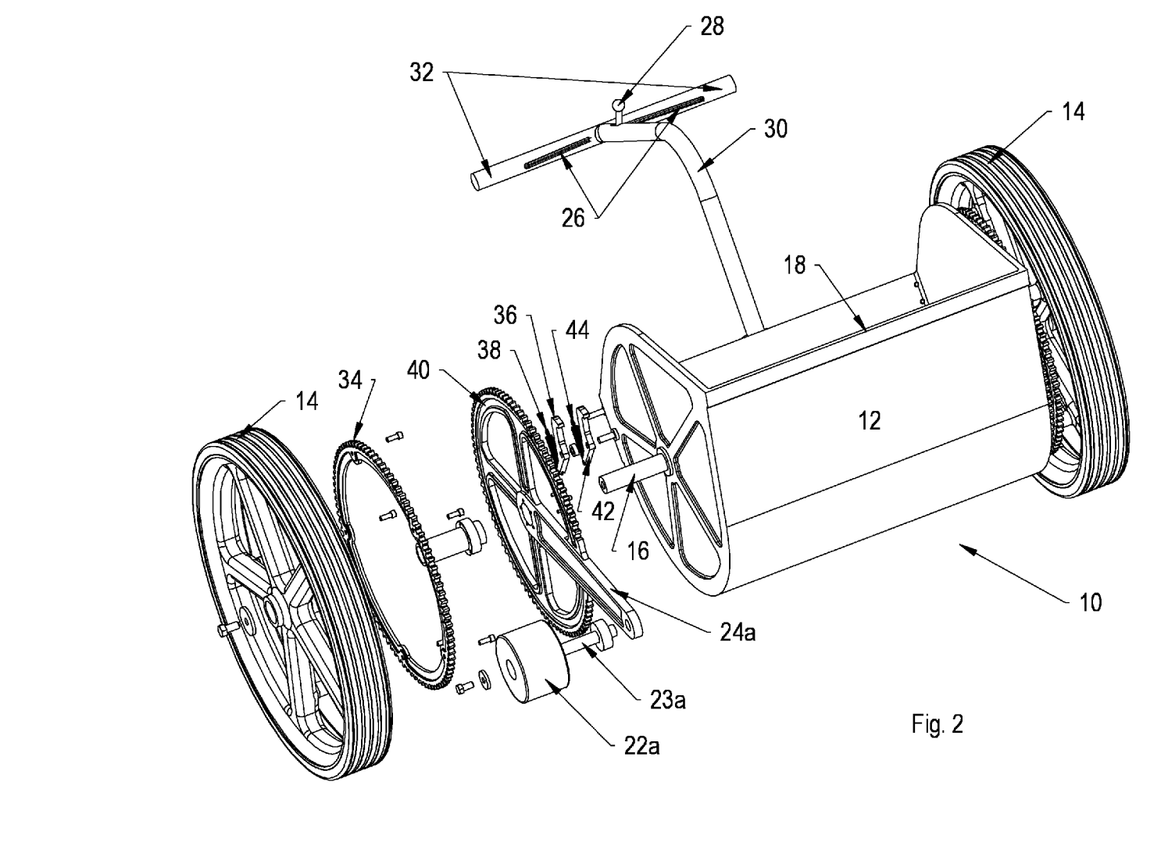
Figure 3:
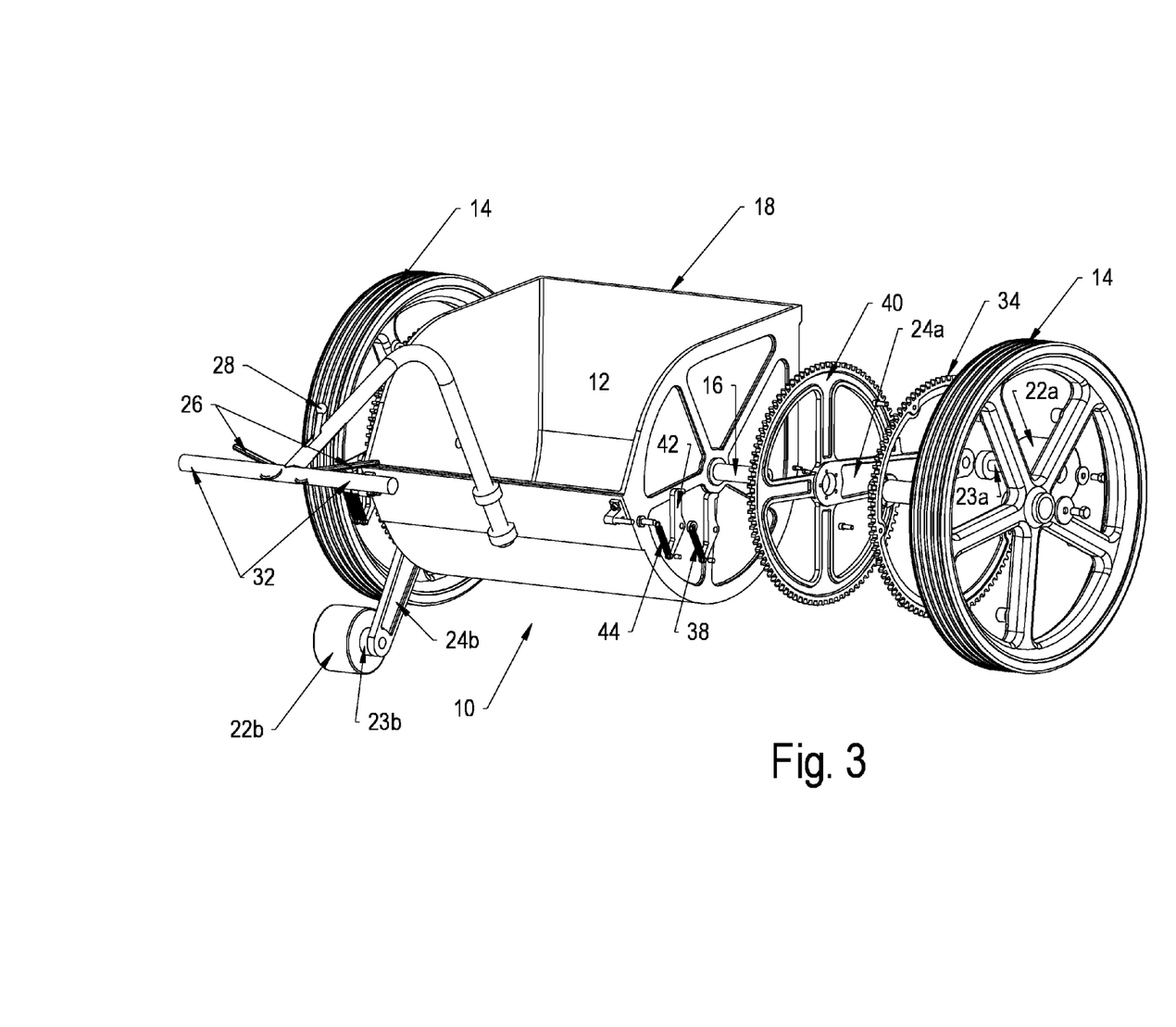
Figure 4:
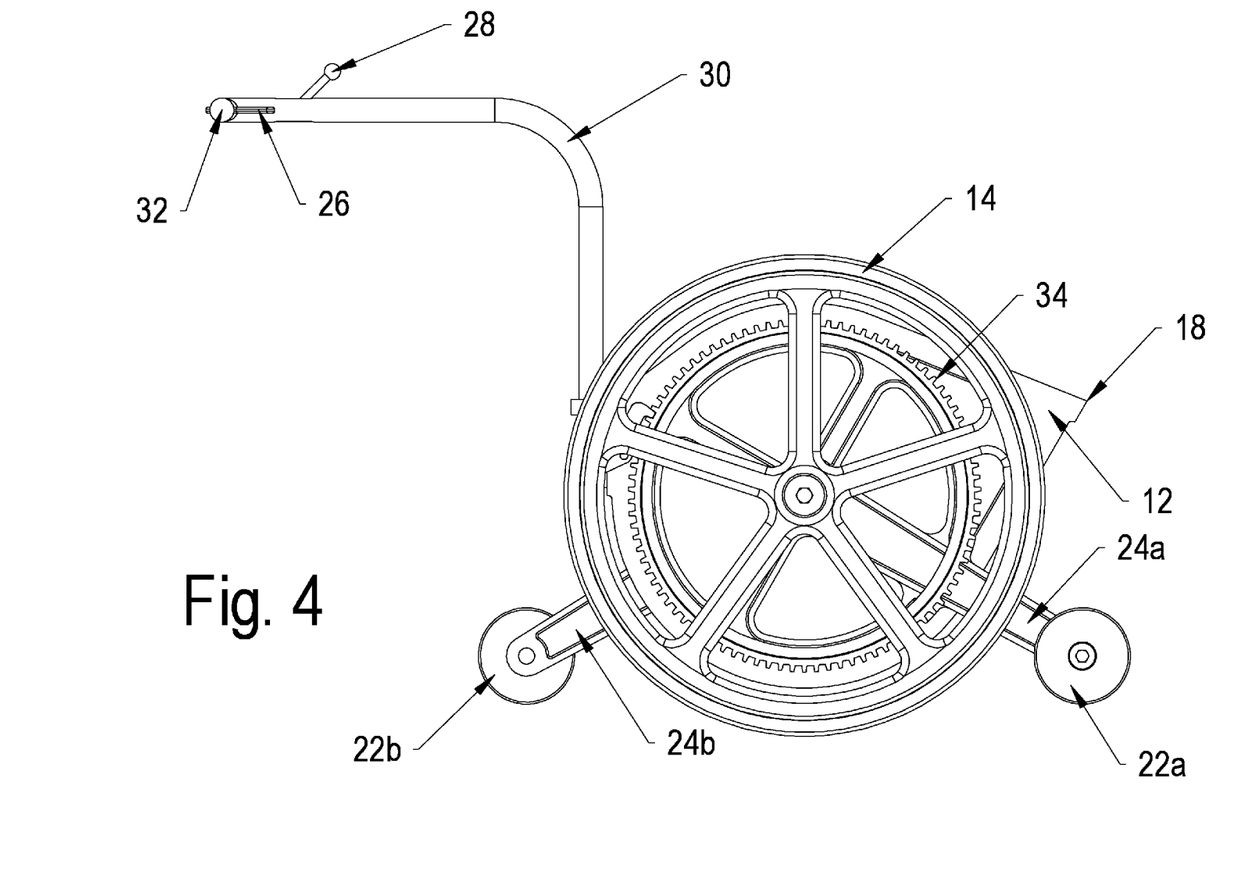
FIG. 4 is a side view of the wheelbarrow of FIGS. 1-3.
Figure 5:
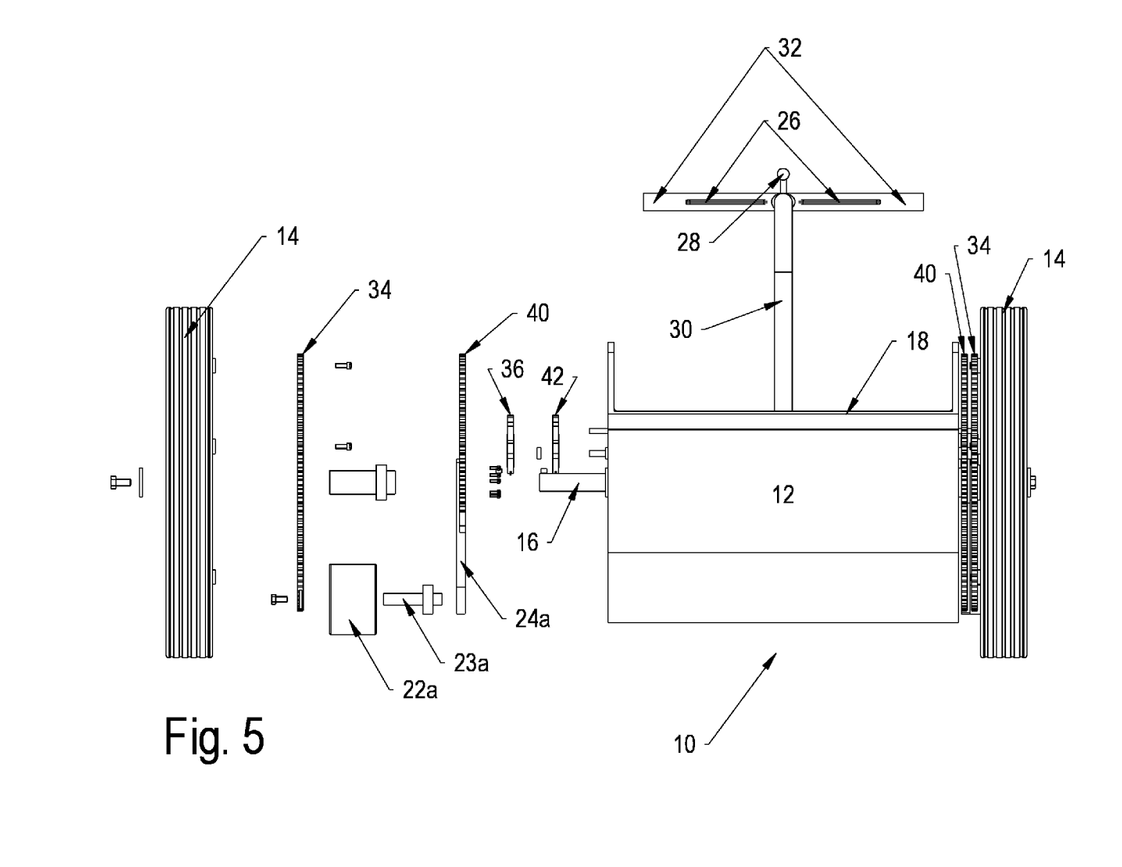
FIG. 5 is a partially-exploded front view of the wheelbarrow of FIGS. 1-3.
Figure 6:
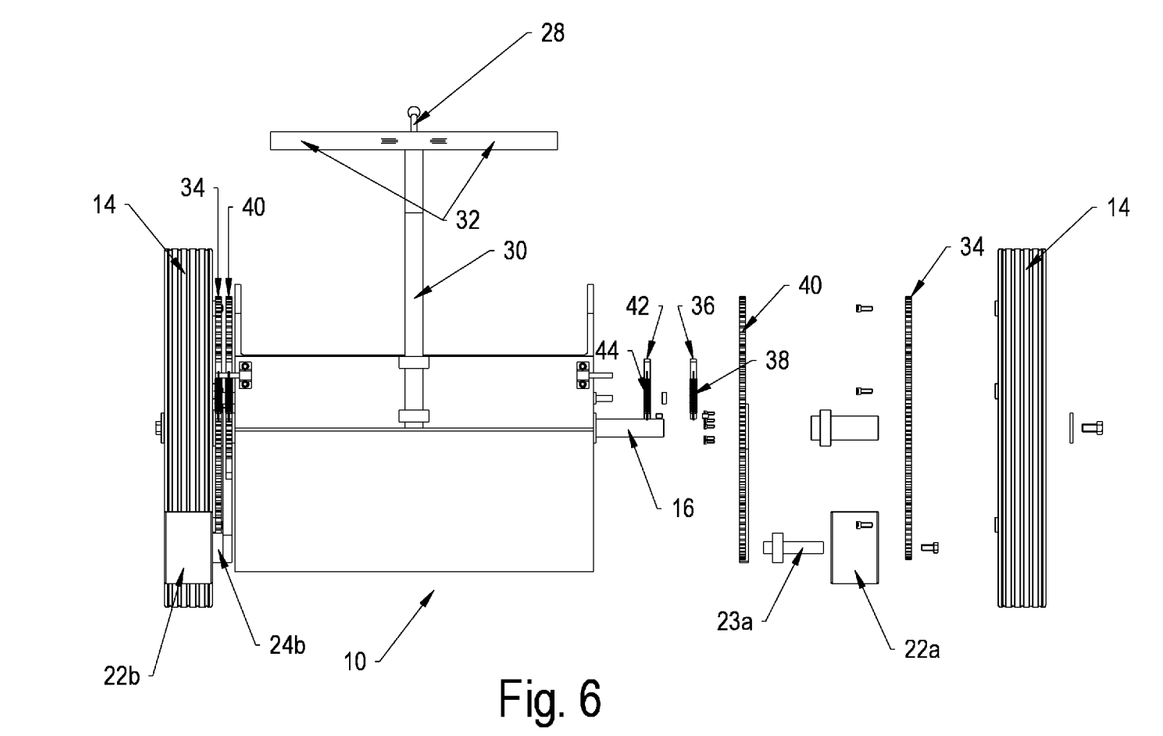
FIG. 6 is a partially-exploded rear view of the wheelbarrow of FIGS. 1-3.
Figure 7:
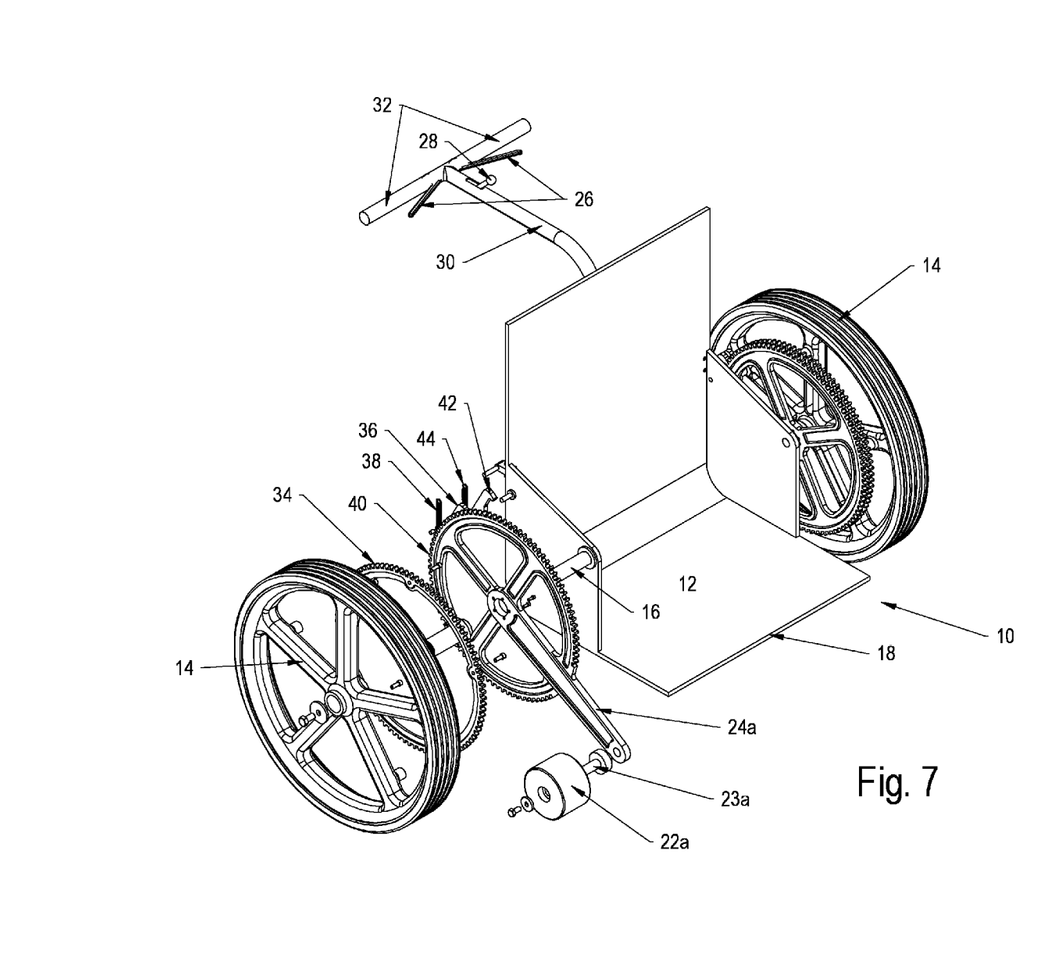
FIG. 7 is a partially-exploded perspective view of a lift cart according to the present disclosure.

Turning to the drawings, there is seen a first embodiment of a hand cart 10 according to the present disclosure. As illustrated in FIGS. 1-6, the hand cart 10 is in the form of a wheelbarrow that includes a bed or bucket 12 for receiving a load. Alternatively, the hand cart 10 may be in the form of a lift cart, as seen in FIG. 7. An axle extends from opposite sides of the bed 12 for rotatably supporting the load-bearing wheels 14 of wheelbarrow 10 on opposite sides of the bed 12. As illustrated, the axle comprises two stub shafts 16, one extending from each side of the bed 12.

In keeping with one aspect of the disclosure, the bed 12 is configured and the axle 16 located so that, when loaded, the center of gravity if the bed and load will generally coincide with the axle 16 (and axis of rotation of the load-bearing wheels 14). This results in less force being required to rotate the bed 12 about the axle 16 to, e.g., tip the bed 12 for dumping its contents or for loading the bed 12. As described in greater detail below, one or both of the load-bearing wheels 14 preferably has a locking or braking mechanism associated therewith to selectively permit or prevent rotation of the wheels 14 relative to the axle 16. As illustrated, the bed 12 may also be configured to have an elongated, substantially linear lip or edge 18, such that the bed 12 may be rotated about the axle 16 to have the lip 18 lie flat along the ground to further facilitate loading or dumping.

In keeping with another aspect of the disclosure, the hand cart 10 is provided with stabilizing wheels 22a, 22b on opposite sides of the bed 12. Each stabilizing wheel 22a, 22b is rotatably mounted to a support arm 24a, 24b that is also mounted for rotation about the axle 16. As illustrated, the stabilizing wheels 22a, 22b rotate about axles 23a, 23b secured to the support arms 24a, 24b. Alternatively, the stabilizing wheels 22a, 22b may be caster wheels that also pivot about a vertical axis, thus enhancing the maneuverability of the wheelbarrow 10.

As described in greater detail below, the one or both of the support arms 24a, 24b for the stabilizing wheels 22a, 22b also has a locking mechanism associated therewith, so that the support arms 24a, 24b may be locked in position relative to the bed 12 (for when the wheelbarrow 10 is at rest or being moved across a generally level surface), or be permitted to float (for when the bed 12 is being tipped or moved across a generally uneven or inclined surface). As illustrated, one stabilizing wheel 22a is positioned forward of the bed 12, while the other stabilizing wheel 22b is positioned aft, thus providing enhanced stability about the axis of rotation. However, it is possible to rotate the support arms 24a, 24b so as to have both stabilizing wheels 22a, 22b positioned either forward or aft of the axis of rotation.

An actuator is provided for selectively locking and unlocking each of the locking/braking mechanisms. The actuator may operate to simultaneously lock/unlock the locking mechanisms for both the load bearing wheels 14 and the support arms 24a, 24b for the stabilizing wheels 22a, 22b. Alternatively, the actuator may selectively and independently operate to lock/unlock the locking mechanisms for both the load bearing wheels 14 and the support arms 24a, 24b for the stabilizing wheels 22a, 22b. As illustrated, separate actuators are provided for the load-bearing wheels 14 and the support arms 24a, 24b for the stabilizing wheels 22a, 22b. Specifically, a first actuator 26, comprising a pair of levers 26a, 26b, is provided for the locking mechanism for the load-bearing wheels 14, and a second actuator 28 is provided for the locking mechanism for the stabilizing wheels 22a, 22b. Preferably, the actuators 26, 28 are mounted to a handle 30 associated with the wheelbarrow 10 for ease of access by the user. However, consistent with considerations of ergonomics and user-friendliness, other locations for the actuators may be utilized. As illustrated, the actuator 26 for the locking mechanism for the load-bearing wheels 14 is mounted on the handle 30 adjacent to the grip 32 so that the user may manipulate the levers without releasing the handle 30.

The locking mechanisms may take any of a number of different forms. As illustrated, each of the load-bearing wheels 14 and each of the support arms 24a, 24b for the stabilizing wheels 22a, 22b has a similar locking mechanism comprising a ratchet wheel and pawl assembly connected by a cable (not shown) to the actuators 26, 28. However, the locking mechanisms could comprise disk brakes, drum brakes or the like without departing from the scope of the disclosure.

Specifically, the locking mechanism for each of the load-bearing wheels 14 comprises a ratchet wheel 34 secured to, or otherwise forming part of, each load bearing wheel 14. A pawl 36 for each ratchet wheel 34 is pivotally mounted to the bed 12 and is biased by, e.g., a spring 38 into engagement with its associated ratchet wheel 34 to prevent rotation of the ratchet wheel 34 and thus lock the load-bearing wheels 14 in place. The pawls 36 are selectively disengaged from or moved into engagement with the ratchet wheels 34 by squeezing or releasing the levers 26a, 26b on the handle 30.

The locking mechanism for each of the support arms 24a, 24b for the stabilizing wheels 22a, 22b also comprises a ratchet wheel 40 secured to or otherwise forming part of the support arm 24a, 24b for each stabilizing wheel 22a, 22b. A pawl 42 for each ratchet wheel 40 is pivotally mounted to the bed 12 and biased by, e.g., a spring 44 into engagement with its associated ratchet wheel 40 to prevent rotation of the ratchet wheels 40, and thus maintain their orientation relative to the bed. The pawls 42 are disengaged from the ratchet wheels 40 by moving the lever 28 on the handle 30.

As can be appreciated, the hand cart design disclosed herein addresses several shortcomings inherent in conventional designs. Many advantages stem from the positioning of the payload. Specifically, the payload is evenly distributed over the axle center line of the bad-bearing wheels. This creates a situation where the force applied to the handle required to transport and dump the payload is reduced, and essentially independent of the weight of the payload. Because this force is smaller than would be required with conventional hand carts, the user is capable of handling much heavier loads.

In addition, the design allows the user to keep the payload level at all times regardless of the terrain, even if the user should need to stop and release the device on a grade. In the context of a wheelbarrow, the bucket of the wheelbarrow can also be tilted to an angle about the axle of the load-bearing wheels, and maintain that position, to allow the payload to be loaded or unloaded without having to raise the pay load above the top rim of the bucket. Storage is also facilitated, in that the load-bearing and stabilizing wheels of the wheelbarrow can be locked into a position with the handle extending vertically, so that the wheelbarrow takes up less floor space and/or can be easily stored against a wall.

In normal operation the user controls the hand cart by grasping the handlebars. If the locking mechanisms are controlled by a single actuator, such that they are simultaneously locked or unlocked, a single lever on the handlebars is manipulated, pulling a cable or linkage to disengage the pawls from the ratchet wheels, thus allowing the load-bearing wheels to rotate (so the hand cart can be moved), and also releasing the support arms (so the load stabilizing wheels can follow the terrain both in front and behind the load bearing wheels).

By raising and lowering the handle bars, the user can adjust the angle of the bucket relative to the ground (and therefore maintain the payload at the desired angle during transport), or pivot the bucket over (to dump the payload). The actuator may be configured so that if at any time the operator releases the handle bars, a spring return causes the pawls to engage the ratchets, stopping hand cart from rolling, and maintaining the current angle of the bucket.

Alternatively, and as illustrated, the load-bearing wheels and the support arms for the stabilizing wheels are separately actuated to allow for the selective engagement/disengagement of the two locking mechanisms. Two release levers are required, with one release lever for disengaging the ratchet wheels for the load-bearing wheels, and the other for releasing the ratchet wheels for the support arms for stabilizing wheels. This permits the operator to leave the support arms in a fixed position, if the load is being transported on a smooth flat surface, so that the operator does not have to maintain the angle of the bucket during transport. Locking the position of the stabilizing wheels also prevents rotation of the handle, allowing the user to push with more force in order to move a heavy load. In addition, the operator could select to lock the load-bearing wheels and release the support arms, to allow the wheelbarrow to rotate about load-bearing wheels to dump the payload, while maintaining the stationary position of the wheelbarrow. This would be advantageous if the operator needed to dump the payload while on a grade.

Accordingly, an improved hand cart design has been disclosed that provides for enhanced safety and ease of operation. While the design has been described in terms of a preferred embodiment, there is no intent to limit it to the same, as numerous modifications and alternatives would be apparent to a person skilled in the art upon reference to this disclosure. For example, while the hand cart has been described and illustrated in the context of a wheelbarrow and a lift cart, it can be appreciated that the configuration of the load bearing and stabilizing wheels and their related controls may be suitable for other different types of hand carts.

The invention claimed is:
1. A hand cart comprising:
a) a bed for receiving a load;
b) an axle mounted to the bed;
c) first and second load-bearing wheels rotatably mounted to the axle on opposite sides of the bed;
d) first and second rotatable stabilizing wheels mounted to first and second support arms, respectively, each of the first and second support arms being rotatably mounted relative to the axle on opposite sides of the bed;

e) a first locking mechanism associated with at least one of the first and second load-bearing wheels to selectively permit or prevent rotation of the load-bearing wheels relative to the axle;

f) a second locking mechanism associated with at least one of the first and second support arms to selectively permit or prevent rotation of the support arms relative to the axle; and g) an actuator for selectively locking and unlocking each of the first and second locking mechanisms.

2. The hand cart of claim 1 further comprising a handle, the actuator being mounted to the handle.

3. The hand cart of claim 2 wherein the handle comprises a grip, and the actuator is mounted to the handle adjacent to the grip.

4. The hand cart of claim 1 wherein the actuator simultaneously locks and unlocks both the first and second locking mechanisms.

5. The hand cart of claim 1 wherein the actuator selectively and independently locks and unlocks the first and second locking mechanisms.

6. The hand cart of claim 1 wherein the first locking mechanism comprises a first toothed wheel associated with each of the first and second arms for rotation relative to the axle and a first pawl for each first toothed wheel pivotably mounted to the bed for selective engagement with each of the first toothed wheels.

7. The hand cart of claim 6 wherein the actuator selectively disengages the pawls from the toothed wheels.

8. The hand cart of claim 1 wherein the second locking mechanism comprises a second toothed wheel associated with each of the first and second load-bearing wheels for rotation relative to the axle and a second pawl for each second toothed wheel pivotably mounted to the bed for selective engagement with each of the second toothed wheels.

9. The hand cart of claim 1 wherein at least one of the first and second locking mechanisms comprises a drum brake.

10. The hand cart of claim 1 wherein at least one of the first and second locking mechanisms comprises a disk brake.

11. The hand cart of claim 1 wherein the axle comprises first and second stub shafts extending from opposite sides of the bed.

12. The hand cart of claim 1 wherein the axle is located relative to the bed so as to substantially coincide with the center of gravity of the bed when loaded.

13. The hand cart of claim 1 wherein the bed is a wheelbarrow bucket.

14. The hand cart of claim 1 wherein the bed is a lift truck bucket.

15. The hand cart of claim 1 wherein the first locking mechanism is associated with each of the first and second load bearing wheels.

16. The hand art of claim 1 wherein the second locking mechanism is associated with each of the first and second support arms.

17. The hand cart of claim 1 wherein the first locking mechanism is associated with each of the first and second load bearing wheels and the second locking mechanism is associated with each of the first and second support arms.

* * * * *